(12) United States Patent
Arickan

(10) Patent No.: US 9,306,902 B2
(45) Date of Patent: Apr. 5, 2016

(54) EMBEDDED THIN DHCP FOR WI-FI DIRECT TO PROVIDE AN IP ADDRESS DURING CONNECTION ESTABLISHMENT

(75) Inventor: Gijo G. Arickan, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 515 days.

(21) Appl. No.: 13/597,631

(22) Filed: Aug. 29, 2012

(65) Prior Publication Data

US 2014/0068023 A1    Mar. 6, 2014

(51) Int. Cl.
*G06F 15/16* (2006.01)
*H04L 29/12* (2006.01)
*H04W 76/02* (2009.01)

(52) U.S. Cl.
CPC ......... *H04L 61/2015* (2013.01); *H04L 61/2092* (2013.01); *H04L 61/6004* (2013.01); *H04L 61/6059* (2013.01); *H04W 76/023* (2013.01)

(58) Field of Classification Search
CPC ..................... H04L 29/12216; H04L 29/1232; H04L 61/2015; H04L 61/6059; H04L 61/2092; H04L 61/6004
USPC .......... 709/227, 228, 230, 238, 250
See application file for complete search history.

(56) References Cited

U.S. PATENT DOCUMENTS

| | | | |
|---|---|---|---|
| 7,035,915 B1 * | 4/2006 | Huo et al. | 709/219 |
| 7,152,099 B1 | 12/2006 | Arens | |
| 7,536,464 B1 * | 5/2009 | Dommety et al. | 709/228 |
| 7,886,027 B2 * | 2/2011 | Bolan et al. | 709/220 |
| 8,116,233 B2 | 2/2012 | Lambert et al. | |
| 8,583,831 B2 * | 11/2013 | Orady et al. | 709/250 |
| 8,626,950 B1 * | 1/2014 | MacCarthaigh | H04L 61/1511 709/223 |
| 8,832,238 B2 * | 9/2014 | Gaitonde | H04L 61/6059 709/220 |
| 2002/0131446 A1 * | 9/2002 | Metcalf, III | G05B 19/4186 370/465 |

(Continued)

FOREIGN PATENT DOCUMENTS

EP    2230876 A1    9/2010

OTHER PUBLICATIONS

Bernardos C. J. et al., "Survey of IP address autoconfiguration mechanisms for MANETs; draft-bernardos-manet-autoconf-survey-05.txt", Internet Engineering Task Force (IETF); Standardworkingdraft, Internet Society (ISOC), Rue Des Falaises CH-1205 Geneva, Switzerland, No. 5, Jun. 18, 2010, pp. 1-57, XP015068964, [retrieved on Jun. 18, 2010].

(Continued)

*Primary Examiner* — Viet Vu
(74) *Attorney, Agent, or Firm* — Kevin T. Cheatham

(57) ABSTRACT

An embedded thin DHCP mechanism may issue an IP address in one or two frames that a P2P group owner (GO) transmits to a client during connection establishment. In particular, the IP address may generally comprise an IPv4 address having four octets, wherein the first two octets are hardcoded, the third octet is derived from a physical address of the GO, and the GO passes the fourth octet to the client during connection establishment. The GO may pass the fourth octet to the client in a frame mandatory to connection establishment or include an attribute in the mandatory frame to specify a subsequent frame that will contain the fourth octet. In response to the client receiving the fourth octet, the client may then generate the complete IP address. Additionally, the embedded thin DHCP mechanism may be suitably modified for use with Internet Connection Sharing or IPv6 architectures.

24 Claims, 4 Drawing Sheets

(56) References Cited

U.S. PATENT DOCUMENTS

| | | | | |
|---|---|---|---|---|
| 2002/0186698 | A1* | 12/2002 | Ceniza | 370/401 |
| 2003/0137976 | A1* | 7/2003 | Zhu et al. | 370/354 |
| 2004/0133689 | A1* | 7/2004 | Vasisht | H04W 28/18 709/228 |
| 2008/0075083 | A1* | 3/2008 | Tremaine | H04L 29/1232 370/392 |
| 2009/0285126 | A1 | 11/2009 | Lu et al. | |
| 2010/0067509 | A1 | 3/2010 | Lambert | |
| 2011/0082940 | A1 | 4/2011 | Montemurro et al. | |
| 2011/0085529 | A1 | 4/2011 | Choi et al. | |

OTHER PUBLICATIONS

International Search Report and Written Opinion—PCT/US2013/055339—ISA/EPO—Jan. 27, 2014.

Saleem M. U. et al., "Address Auto-configuration in Mobile Ad Hoc Networks using OLSR", First International Conference on Information and Communication Technologies (ICICT) Karachi, Pakistan Aug. 27-28, 2005, Piscataway, NJ, USA, IEEE, Aug. 27, 2005, pp. 332-336, XP010896807, DOI: 10.1109/ICICT.2005.1598613, ISBN: 978-0-7803-9421-6.

Sun Y. et al., "Dynamic Address Configuration in Mobile Ad hoc Networks", Internet Citation, Jun. 2003, XP002322729, Retrieved from the Internet: URL: University of California, Santa Barbara, http://www.cs.ucsb.edu/suny/publications/tr_2003-11.ps [retrieved on Mar. 31, 2005].

Droms R: "Dynamic Host Configuration Protocol; RFC 2131" Internet Engineering Task Force (IETF), (Mar. 1997), pp. 8-10.

"Wi-Fi Peer-to-Peer (P2P) Technical Specification," Wi-Fi Alliance Technical Committee P2P Task Group, version 1.1, 2010, pp. 1-159.

* cited by examiner

EMBEDDED THIN DHCP FOR WI-FI DIRECT TO PROVIDE AN IP ADDRESS DURING CONNECTION ESTABLISHMENT

FIELD OF DISCLOSURE

The present application generally relates to an embedded thin mechanism to assign an IP address to a client device without using a DHCP server, and in particular, to providing an IP address to a client device during a connection establishment phase to join a peer-to-peer network using one or more peer-to-peer frames.

BACKGROUND

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. A wireless communication network may also be referred to as a wide area network (WAN) or a wireless local area network (WLAN).

A wireless communication network may include a number of base stations that can support communication for a number of devices. A device may communicate with a base station via a downlink and uplink for WAN communication. The downlink (or forward link) refers to the communication link from the base station to the device, and the uplink (or reverse link) refers to the communication link from the device to the base station. The device may also support peer-to-peer (P2P) communication with other devices. For example, certain wireless communication networks may implement technologies such as Wi-Fi or Wi-Fi Direct that enable devices to make a one-to-one connection or simultaneously connect to a group that includes several devices in order to directly communicate data peer-to-peer (e.g., as described in "Wi-Fi Certified Wi-Fi Direct™: Personal, portable Wi-Fi® technology," the contents of which are hereby incorporated by reference in their entirety). However, because existing wireless communication networks that support P2P connectivity tend to suffer from various drawbacks and limitations, including mechanisms typically used to assign client devices network addresses that are needed to communicate P2P, a need may exist for improved mechanisms to efficiently support P2P communication between devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any aspect. Its sole purpose is to present some concepts of one or more aspects in a simplified form as a prelude to the more detailed description that is presented below.

Exemplary embodiments are directed to an embedded thin mechanism to provide an Internet Protocol (IP) address during a connection establishment phase in which a client device joins a peer-to-peer (P2P) network (or P2P group), wherein the embedded thin mechanism disclosed herein may eliminate or substantially reduce the need to have a Dynamic Host Configuration Protocol (DHCP) server assign the IP address to the client device while preserving the functionality that the DHCP server would otherwise serve to a wireless network in a faster and more efficient manner. In particular, whereas conventional mechanisms employed by DHCP servers require four handshakes or frame exchanges (including a DHCP decline packet) to issue an IP address, the embedded thin DHCP mechanism described herein may issue an IP address in one or two frame exchanges, whereby the IP address may be issued in approximately two seconds or less after connection establishment. For example, this two second period may generally include the amount of time to set the IP address to the IP stack, otherwise the IP address can issued almost instantaneously (e.g., where the issuing entity pre-allocates one or more IP addresses to the IP stack prior to receiving a connection establishment request and then issues the pre-allocated IP addresses to devices that transmit connection establishment requests to the issuing entity).

According to one exemplary embodiment, the embedded thin DHCP mechanism disclosed herein may assign an IP address to a client device seeking to join a previously established P2P network or P2P group during the connection establishment phase between the client device and a group owner that manages the previously established P2P network or P2P group, or alternatively when two P2P capable devices seek to establish a new P2P network or P2P group, the group owner may be identified and the IP address may be assigned during the connection establishment phase between the two P2P capable devices. In one embodiment, the IP address assigned during the connection establishment phase may include a first hardcoded part, a second part derived from a physical address of the P2P group owner (e.g., a Media Access Control (MAC) address), and a third part passed in to the P2P client from the P2P group owner. More particularly, because a P2P network tends to include a small group of devices that fall under a common subnet, the hardcoded part of the IP address may comprise the first two octets (e.g., 192.168.xxx.xxx), while the client device may derive the third octet that specifies the subnet address from the physical address of the group owner, which may be known from one or more frames that the group owner exchanges with the client devices during or prior to connection establishment. Furthermore, in one embodiment, the fourth octet may be passed to the client device from the group owner during the connection establishment phase. For example, the group owner serving to manage a particular P2P network or P2P group may maintain a list of IP addresses within its P2P network or P2P group and use two different techniques to send the fourth octet to the client device. For example, in one embodiment, the fourth octet may be embedded in an Information Element (IE) part of any suitable frame that may be mandatory in the connection establishment phase and may preferably be embedded in the last frame exchanged during the connection establishment (e.g., an association response frame). In another embodiment, the IE part of the selected mandatory (and preferably final) frame in the connection establishment phase may include an attribute that specifies a subsequent data frame following the association that will contain the IP number (e.g., the first data frame or another data frame that the group owner will transmit to the client device after the association response frame). In either embodiment, in response to the client device receiving the fourth octet, the client device may generate the complete IP address. Those skilled in the pertinent art will appreciate that splitting the IP address into different octets and passing the fourth octet alone to the client device may not be mandatory, in that the complete IP address may be suitably embedded in the IE part of the applicable frame that otherwise contains the IP number corresponding to the fourth octet. However, splitting the IP address passing the fourth octet alone may provide greater security than sending the entire IP address.

According to one embodiment, a method for providing an embedded thin DHCP mechanism may comprise a client device receiving one or more first data frames that specify a physical address associated with a group owner that manages a peer-to-peer network and receiving one or more second data frames that specify an IP number during a phase to establish a connection with the peer-to-peer network. In one embodiment, the client device may then generate an IP address to communicate on the peer-to-peer network via the established connection. For example, in one embodiment, the IP address may comprise a first hardcoded octet, a second hardcoded octet, a third octet derived from the physical address associated with the group owner that manages the peer-to-peer network, and a fourth octet corresponding to the IP number specified in the one or more second data frames. In one embodiment, the one or more second data frames may comprise an association response frame having the IP number embedded therein, an association response frame and at least one subsequent frame that specify the IP number in multiple separate parts, and/or an association response frame that specifies a subsequent frame and subsequent frame itself, which has the IP number embedded therein. In embodiments where the second data frames comprise the association response frame to specify the subsequent frame and the subsequent frame has the IP number embedded therein, the client device may transmit an acknowledgement message to the group owner in response to successfully receiving the subsequent frame that has the IP number embedded therein. Furthermore, if the group owner has not received the acknowledgement message within a suitable timeout period, the group owner may then retransmit the frame having the IP number embedded therein.

According to one embodiment, an apparatus for providing an embedded thin DHCP mechanism may comprise means for receiving one or more first data frames that specify a physical address associated with a group owner that manages a peer-to-peer network and means for receiving one or more second data frames that specify an IP number during a phase to establish a connection with the peer-to-peer network. In one embodiment, the apparatus may further comprise means for generating an IP address to communicate on the peer-to-peer network via the established connection, wherein the IP address may comprise a first hardcoded octet, a second hardcoded octet, a third octet derived from the physical address associated with the group owner that manages the peer-to-peer network, and a fourth octet corresponding to the IP number specified in the one or more second data frames. In one embodiment, the one or more second data frames may comprise an association response frame having the IP number embedded therein, an association response frame and at least one subsequent frame that specify the IP number in multiple separate parts, and/or an association response frame that specifies a subsequent frame and subsequent frame itself, which has the IP number embedded therein. In embodiments where the second data frames comprise the association response frame to specify the subsequent frame and the subsequent frame has the IP number embedded therein, the apparatus may include means for transmitting an acknowledgement message to the group owner in response to successfully receiving the subsequent frame that has the IP number embedded therein. Furthermore, if the group owner has not received the acknowledgement message within a suitable timeout period, the group owner may then retransmit the frame having the IP number embedded therein, in which case the means for transmitting the acknowledgment message send the acknowledgement message to the group owner in response to successfully receiving the retransmitted frame.

According to one embodiment, an apparatus for providing an embedded thin DHCP mechanism may comprise a processor configured to receive one or more first data frames that specify a physical address associated with a group owner that manages a peer-to-peer network and to receive one or more second data frames that specify an IP number during a phase to establish a connection with the peer-to-peer network. In one embodiment, the processor may be further configured to generate an IP address to communicate on the peer-to-peer network via the established connection, wherein the IP address may comprise a first hardcoded octet, a second hardcoded octet, a third octet derived from the physical address associated with the group owner that manages the peer-to-peer network, and a fourth octet corresponding to the IP number specified in the one or more second data frames. In addition, the apparatus may comprise a memory coupled to the processor.

According to one embodiment, a computer-readable storage medium may store computer-executable instructions for providing an embedded thin DHCP mechanism, wherein executing the computer-executable instructions on a processor may cause the processor to receive one or more first data frames that specify a physical address associated with a group owner that manages a peer-to-peer network and receive one or more second data frames that specify an IP number during a phase to establish a connection with the peer-to-peer network. In one embodiment, executing the computer-executable instructions on the processor may further cause the processor to generate an IP address to communicate on the peer-to-peer network via the established connection, wherein the IP address may comprise a first hardcoded octet, a second hardcoded octet, a third octet derived from the physical address associated with the group owner that manages the peer-to-peer network, and a fourth octet corresponding to the IP number specified in the one or more second data frames.

According to one embodiment, a method for providing an embedded thin DHCP mechanism may comprise a group owner that manages a peer-to-peer network transmitting one or more first data frames that specify a physical address associated with the group owner and transmitting one or more second data frames that specify an IP number assigned to a client device on the peer-to-peer network in response to receiving one or more requests to establish a connection with the peer-to-peer network from the client device. For example, the peer-to-peer network may have been previously established, in which case the group owner may have been determined when the peer-to-peer network was previously established, or alternatively the group owner role and the client device role may be assigned to two respective devices seeking to newly establish the peer-to-peer network (e.g., based on a resource negotiation between the two respective devices). In one embodiment, the method may further comprise the group owner storing the IP number assigned to the client device in a list maintained to manage the peer-to-peer network. In one embodiment, the one or more second data frames that specify the IP number may comprise an association response frame having the IP number embedded therein, an association response frame and at least one subsequent frame that specify the IP number in multiple separate parts, and/or an association response frame that specifies a subsequent frame and subsequent frame having the IP number embedded therein. In embodiments where the second data frames comprise the association response frame to specify the subsequent frame and the subsequent frame having the IP number embedded therein, the method may further comprise the group owner starting a timer in response to transmitting the subsequent frame that has the IP number embedded therein and retransmitting the subsequent frame if an acknowledgement message associated with the subsequent frame has not been received before the timer has expired. Alternatively, in response to determining that the acknowledgement message has been received before the timer has expired, the group owner may store the IP number assigned to the client device in the list. Furthermore, in one embodiment, the method may further comprise marking the IP number assigned to the client device inactive in response to determining that the client device has disconnected from or lost connectivity with the peer-to-peer network, wherein the inactive IP number may be reissued to the client device in response to the client device rejoining the peer-to-peer network within a predetermined time period or alternatively removed from the list in response to the client device not rejoining the peer-to-peer network within the predetermined time period.

According to one embodiment, an apparatus for providing an embedded thin DHCP mechanism may comprise means for transmitting one or more first data frames that specify a physical address associated with a group owner that manages a peer-to-peer network and means for transmitting one or more second data frames that specify an IP number assigned to a client device on the peer-to-peer network in response to receiving one or more requests to establish a connection with the peer-to-peer network from the client device. For example, the peer-to-peer network may have been previously established, in which case the group owner may have been determined when the peer-to-peer network was previously established, or alternatively the group owner role and the client device role may be assigned to two respective devices seeking to newly establish the peer-to-peer network (e.g., based on a resource negotiation between the two respective devices). In one embodiment, the apparatus may further comprise means for storing the IP number assigned to the client device on the peer-to-peer network in a list maintained to manage the peer-to-peer network. In one embodiment, the one or more second data frames that specify the IP number may comprise an association response frame having the IP number embedded therein, an association response frame and at least one subsequent frame that specify the IP number in multiple separate parts, and/or an association response frame that specifies a subsequent frame and subsequent frame having the IP number embedded therein. In embodiments where the second data frames comprise the association response frame to specify the subsequent frame and the subsequent frame having the IP number embedded therein, the apparatus may further comprise means for starting a timer in response to transmitting the subsequent frame that has the IP number embedded therein and apparatus retransmitting the subsequent frame if an acknowledgement message associated with the subsequent frame has not been received before the timer has expired. Alternatively, in response to determining that the acknowledgement message has been received before the timer has expired, the means for storing may store the IP number in the list. Furthermore, in one embodiment, the apparatus may comprise means for marking the IP number assigned to the client device inactive in response to determining that the client device has disconnected from or lost connectivity with the peer-to-peer network and means for either reissuing the inactive IP number to the client device or removing the inactive IP number from the list based on whether or not the client device rejoins the peer-to-peer network within a predetermined time period.

According to one embodiment, an apparatus for providing an embedded thin DHCP mechanism may comprise a processor configured to transmit one or more first data frames that specify a physical address associated with a group owner that manages a peer-to-peer network and to transmit one or more second data frames that specify an IP number assigned to a client device on the peer-to-peer network in response to one or more requests to establish a connection with the peer-to-peer network from the client device. For example, the peer-to-peer network may have been previously established, in which case the group owner may have been determined when the peer-to-peer network was previously established, or alternatively the group owner role and the client device role may be assigned to two respective devices seeking to newly establish the peer-to-peer network (e.g., based on a resource negotiation between the two respective devices). In addition, the apparatus may comprise a memory configured to store the IP number assigned to the client device in a list maintained to manage the peer-to-peer network.

According to one embodiment, a computer-readable storage medium may store computer-executable instructions for providing an embedded thin DHCP mechanism, wherein executing the computer-executable instructions on a processor may cause the processor to transmit one or more first data frames that specify a physical address associated with a group owner that manages a peer-to-peer network, transmit one or more second data frames that specify an IP number assigned to a client device on the peer-to-peer network in response to one or more requests to establish a connection with the peer-to-peer network from the client device, and store the IP number assigned to the client device in a list maintained to manage the peer-to-peer network.

Other objects and advantages associated with the embodiments relating to the embedded thin DHCP mechanism disclosed herein will be apparent to those skilled in the art based on the accompanying drawings and detailed description.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
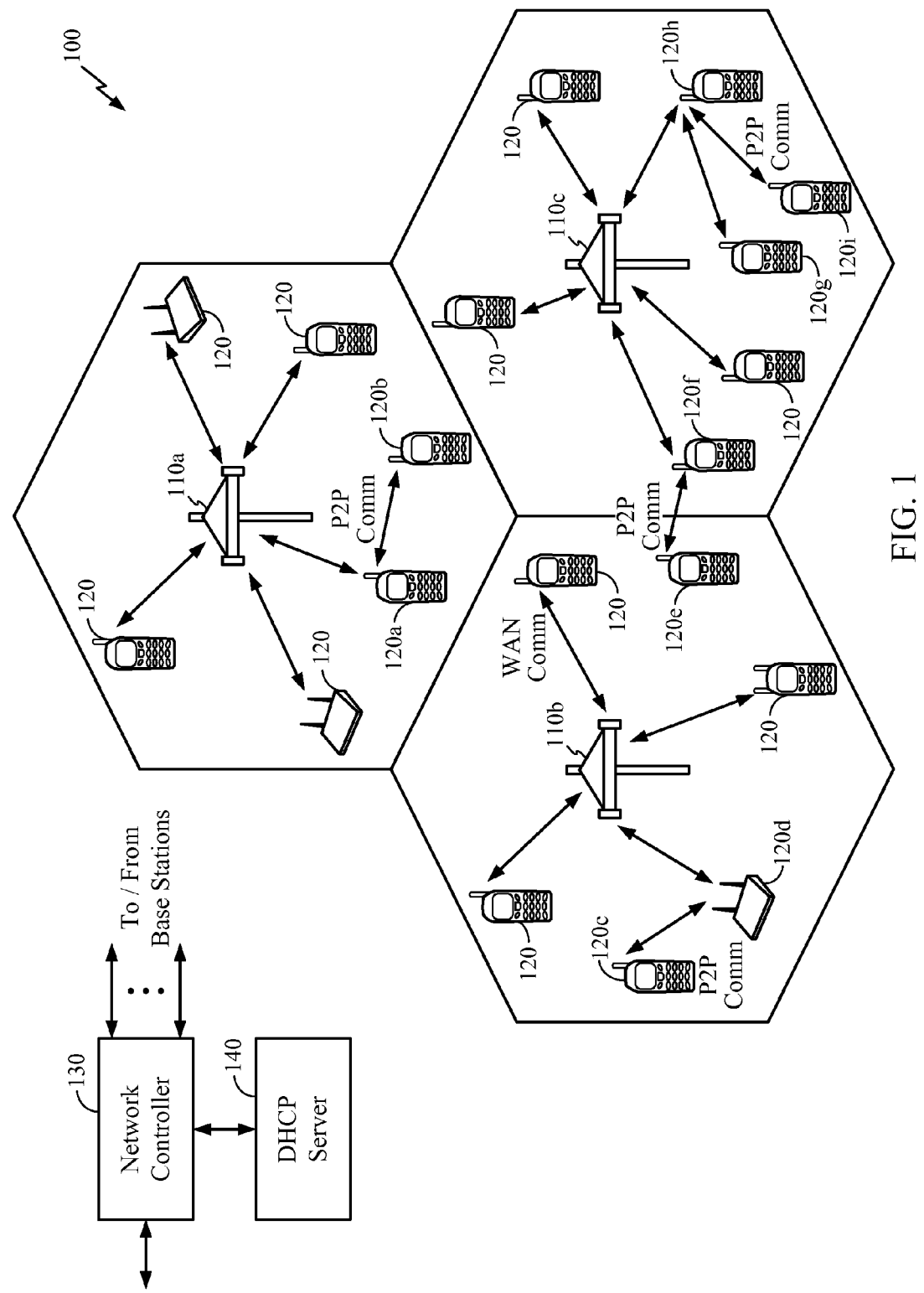
FIG. 1 illustrates an exemplary wireless communication network supporting P2P communication, according to one exemplary embodiment.

Aspects of the invention are disclosed in the following description and related drawings showing specific examples having various exemplary embodiments of the invention. Alternate embodiments may be apparent those skilled in the pertinent art upon reading this disclosure, and may be constructed and practiced without departing from the scope or spirit of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is provided to describe particular embodiments only and is not intended to limit any embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

According to one exemplary embodiment, FIG. 1 illustrates an exemplary wireless communication network or WAN 100 supporting P2P communication, which may be a LTE network or another suitable WAN that includes various base stations 110 and other network entities. For simplicity, only three base stations 110a, 110b and 110c, one network controller 130, and one Dynamic Host Configuration Protocol (DHCP) server 140 are shown in FIG. 1. A base station 110 may be an entity that communicates with devices 120 and may also be referred to as a Node B, an evolved Node B (eNB), an access point, etc. Each base station 110 may provide communication coverage for a particular geographic area and may support communication for the devices 120 located within the coverage area. To improve network capacity, the overall coverage area of a base station 110 may be partitioned into multiple (e.g., three) smaller areas, wherein each smaller area may be served by a respective base station 110. In 3GPP, the term "cell" can refer to a coverage area of a base station 110 and/or a base station subsystem 110 serving this coverage area, depending on the context in which the term is used. In 3GPP2, the term "sector" or "cell-sector" can refer to a coverage area of a base station 110 and/or a base station subsystem 110 serving this coverage area. For clarity, the 3GPP concept of "cell" may be used in the description herein.

A base station 110 may provide communication coverage for a macro cell, a pico cell, a femto cell, and/or other cell types. A macro cell may cover a relatively large geographic area (e.g., several kilometers in radius) and may allow unrestricted access by devices 120 with service subscription. A pico cell may cover a relatively small geographic area and may allow unrestricted access by devices 120 with service subscription. A femto cell may cover a relatively small geographic area (e.g., a home) and may allow restricted access by devices 120 having association with the femto cell (e.g., devices 120 in a Closed Subscriber Group (CSG)). In the example shown in FIG. 1, wireless network 100 includes macro base stations 110a, 110b and 110c for macro cells. Wireless network 100 may also include pico base stations 110 for pico cells and/or home base stations 110 for femto cells (not shown in FIG. 1).

Network controller 130 may couple to a set of base stations 110 and may provide coordination and control for these base stations 110. Network controller 130 may be a single network entity or a collection of network entities that can communicate with the base stations via a backhaul. The base stations may also communicate with one another, e.g., directly or indirectly via wireless or wireline backhaul. DHCP server 140 may support P2P communication, as described below. DHCP server 140 may be part of wireless network 100, external to wireless network 100, run via Internet Connection Sharing (ICS), or any suitable combination thereof. DHCP server 140 may be a separate entity (e.g., as shown in FIG. 1) or may be part of a base station 110, network controller 130, or some other entity. In any case, DHCP server 140 may be reachable by devices 120 desiring to communicate peer-to-peer.

Devices 120 may be dispersed throughout wireless network 100, and each device 120 may be stationary or mobile. A device 120 may also be referred to as a node, user equipment (UE), a station, a mobile station, a terminal, an access terminal, a subscriber unit, etc. A device 120 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A device 120 may communicate with base stations 110 in the wireless network 100 and may further communicate peer-to-peer with other devices 120. For example, as shown in FIG. 1, devices 120a and 120b may communicate peer-to-peer, devices 120c and 120d may communicate peer-to-peer, devices 120e and 120f may communicate peer-to-peer, and devices 120g, 120h, and 120i may communicate peer-to-peer, while remaining devices 120 may communicate with base stations 110. As further shown in FIG. 1, devices 120a, 120d, 120f, and 120h may also communicate with base stations 100, e.g., when not engaged in P2P communication or possibly concurrent with P2P communication.

In the description herein, WAN communication may refer to communication between a device 120 and a base station 110 in wireless network 100, e.g., for a call with a remote entity such as another device 120. A WAN device is a device 120 that is interested or engaged in WAN communication. P2P communication refers to direct communication between two or more devices 120, without going through any base station 110. A P2P device is a device 120 that is interested or engaged in P2P communication, e.g., a device 120 that has traffic data for another device 120 within proximity of the P2P device. Two devices may be considered to be within proximity of one another, for example, if each device 120 can detect the other device 120. In general, a device 120 may communicate with another device 120 either directly for P2P communication or via at least one base station 110 for WAN communication.

In one embodiment, direct communication between P2P devices 120 may be organized into P2P groups. More particularly, a P2P group generally refers to a group of two or more devices 120 interested or engaged in P2P communication and a P2P link refers to a communication link for a P2P group. Furthermore, in one embodiment, a P2P group may include one device 120 designated a P2P group owner (or a P2P server) and one or more devices 120 designated P2P clients that are served by the P2P group owner. The P2P group owner may perform certain management functions such as exchanging signaling with a WAN, coordinating data transmission between the P2P group owner and P2P clients, etc. For example, as shown in FIG. 1, a first P2P group includes devices 120a and 120b under the coverage of base station 110a, a second P2P group includes devices 120c and 120d under the coverage of base station 110b, a third P2P group includes devices 120e and 120f under the coverage of different base stations 110b and 110c, and a fourth P2P group includes devices 120g, 120h and 120i under the coverage of base station 110c. Devices 120a, 120d, 120f, and 120h may be P2P group owners for their respective P2P groups and devices 120b, 120c, 120e, 120g, and 120i may be P2P clients in their respective P2P groups. The other devices 120 in FIG. 1 may be engaged in WAN communication.

In one embodiment, P2P communication may occur only within a P2P group and may further occur only between the P2P group owner and the P2P clients associated therewith. For example, if two P2P clients within the same P2P group (e.g., devices 120g and 120i) desire to exchange information, one of the P2P clients may send the information to the P2P group owner (e.g., device 120h) and the P2P group owner may then relay transmissions to the other P2P client. In one embodiment, a particular device 120 may belong to multiple P2P groups and may behave as either a P2P group owner or a P2P client in each P2P group. Furthermore, in one embodiment, a particular P2P client may belong to only one P2P group or belong to multiple P2P group and communicate with P2P devices 120 in any of the multiple P2P groups at any particular moment. In general, communication may be facilitated via transmissions on the downlink and uplink. For WAN communication, the downlink (or forward link) refers to the communication link from base stations 110 to devices 120, and the uplink (or reverse link) refers to the communication link from devices 120 to base stations 110. For P2P communication, the P2P downlink refers to the communication link from P2P group owners to P2P clients and the P2P uplink refers to the communication link from P2P clients to P2P group owners. In certain embodiments, rather than using WAN technologies to communicate P2P, two or more devices may form smaller P2P groups and communicate P2P on a wireless local area network (WLAN) using technologies such as Wi-Fi or Wi-Fi Direct (e.g., to enable P2P communication between two or more mobile phones, game consoles, laptop computers, etc.).

P2P communication may offer certain advantages over WAN communication, especially for devices 120 located close to each other. In particular, efficiency may improve because the pathloss between two devices 120 may be substantially smaller than the pathloss between either device 120 to its serving base station 110. Furthermore, the two devices 120 may directly communicate with each other wirelessly via a single transmission hop for P2P communication rather than two hops for WAN communication, which typically require a first hop for the uplink from one device 120 to its serving base station 100 and a second hop for the downlink from the same or different base station 110 to the other device 120. P2P communication may therefore offer improved user capacity and improved network capacity by shifting some load over to P2P communication, and furthermore, may eliminate the need to have a central access point because wireless devices within suitable range of each other can discover one another and communicate with one another directly.

In general, a wireless P2P (or Wi-Fi Direct) connection between P2P clients and a P2P group owner requires the P2P clients and the P2P group owner to have an IP address to communicate data over the IP layer. For example, once a data link layer (or layer 2) connection has been established for a P2P network (or any other network) connection, the devices 120 will then seek an IP address to initiate a data transfer between the devices 120. In conventional P2P systems, the IP addresses associated with the P2P clients and the P2P group owner are static IP addresses assigned by a network administrator, or more commonly, dynamically assigned by an external DHCP server 140 or a DHCP server run by ICS. In the latter case, a conventional DHCP server 140 is a heavy weight component that typically performs functionality to assign a unique IP address, assign a subnet mask, assign a gateway or set the default gateway, provide a Bootstrap Protocol (BOOTP) mechanism, and manage the IP lease period. However, because a P2P network typically involve a small group of devices 120, a complicated and heavy weight mechanism such as the DHCP server 140 may not be needed. In particular, because the default gateway can always be chosen to operate P2P networks, the BOOTP mechanism that the DHCP server 140 provides may be unnecessary to support P2P communication, and furthermore, the subnet mask can be fixed because P2P networks are confined to a single subnet. Additionally, whereas a conventional DHCP server 140 automatically configures TCP/IP during boot up, in the case of P2P networks connection establishment is more important than system boot up to obtain the IP address, and therefore the functionality that the DHCP server 140 provides to assign the unique IP address may be considered rudimentary for a P2P wireless network.

Accordingly, the complicated and often unnecessary features provided via conventional DHCP servers 140 can create additional network overhead and time delays to configured TCP/IP in P2P networks and further increases the code base needed to support P2P communication quite drastically (e.g., because some conventional DHCP servers 140 can contain upwards of 50,000 lines of code and take up to 10 seconds or more to become initialized and ready). Moreover, the DHCP server 140 cannot always run at a particular device 120 because the P2P specification provides that the role of P2P group owner may only be assigned during the connection establishment phase and that either device 120 seeking to establish a P2P connection can become the P2P group owner, while smaller networks like Universal Plug and Play (UPnP) that employ mechanisms to centrally maintain a list of IP addresses for clients and use Address Resolution Protocol (ARP) messages to eliminate duplicity can flood the network 100 with the ARP messages in addition to being cumbersome to implement.

As such, the following description provides an embedded thin DHCP mechanism in which the IP address may be assigned to P2P clients and the P2P group owner during the connection establishment phase using P2P frames, which may eliminate or substantially reduce the need to have the DHCP server 140 assign the IP address to P2P clients and the P2P group owner. Furthermore, the embedded thin DHCP mechanism described herein may preserve the functionality that the DHCP server 140 would otherwise serve to a wireless P2P network while providing faster and more efficient functionality and operation and eliminating an extra component (e.g., the DHCP server 140) for any P2P application. For example, compared to the conventional mechanisms employed by the DHCP server 140, which requires four handshakes or frame exchanges (including a DHCP decline packet) to issue an IP address, the embedded thin DHCP mechanism described herein may issue an IP address in one or two frame exchanges, as will be described in further detail herein. Furthermore, the embedded thin DHCP mechanism described herein can be implemented in approximately 500 lines of code, which provides a substantial improvement in the code base required to support P2P communications in comparison to the approximately 50,000 lines required in the DHCP server 140, and can issue IP addresses to P2P clients in less than two seconds after connection establishment, which can reduce latency in comparison to the 10 seconds required to initialize the DHCP server 140 and the additional time required for the DHCP server 140 to subsequently issue the IP address. For example, this two second period may generally include the amount of time to set the IP address to the IP stack, otherwise the IP address can issued almost instantaneously (e.g., where the issuing entity pre-allocates one or more IP addresses to the IP stack prior to receiving a connection establishment request and then issues the pre-allocated IP addresses to devices that transmit connection establishment requests to the issuing entity). Additionally, the embedded thin DHCP mechanism may eliminate or substantially reduce the need to employ DHCP mechanisms such as managing lease expirations, maintaining complicated hash tables, and transmitting periodic discovery frames, among others, and thereby reduce runtime operational overhead as compared to the DHCP server 140.

According to one exemplary embodiment, the embedded thin DHCP mechanism disclosed herein may assign an IP address to a P2P client seeking to join a previously established P2P network or P2P group during the connection establishment phase between the P2P client and the P2P group owner that manages the previously established P2P network or P2P group, or alternatively when two P2P capable devices seek to establish a new P2P network or P2P group, the group owner may be identified and the IP address may be assigned during the connection establishment phase between the two P2P capable devices. In one embodiment, the IP address assigned during the connection establishment phase may include a first hardcoded part, a second part derived from a Media Access Control (MAC) address (i.e., physical address) of the P2P group owner, and a third part passed in to the P2P client from the P2P group owner. More particularly, because a P2P network tends to include a small group of devices 120, all of which fall under the same subnet, the hardcoded part of the IP address may comprise the first two octets (e.g., 192.168.xxx.xxx). The P2P clients may then derive the third octet specifying the subnet address from the MAC address of the P2P group owner, which may be supported because the P2P clients will know the MAC address of the P2P group owner from one or more frames that the P2P group owner exchanges with the P2P clients during connection establishment. Furthermore, the embedded thin DHCP mechanism may employ one or more suitable algorithms to derive the subnet address octet from the P2P group owner MAC address to reduce the possibility that the third octet will be duplicated on nearby P2P networks. However, it will be appreciated to those skilled in the pertinent art that whether nearby P2P networks duplicate the third octet may not necessarily have any substantial impact on the operation of either P2P network. In one embodiment, the fourth octet may be passed from the P2P group owner to the P2P client during the connection establishment phase. For example, the P2P group owner that serves as a central authority to manage a particular P2P group can maintain a list of IP addresses within its P2P group, wherein two different techniques may be used to send the fourth octet from the P2P group owner to the P2P client, as will be described in further detail below.

Figure 2:
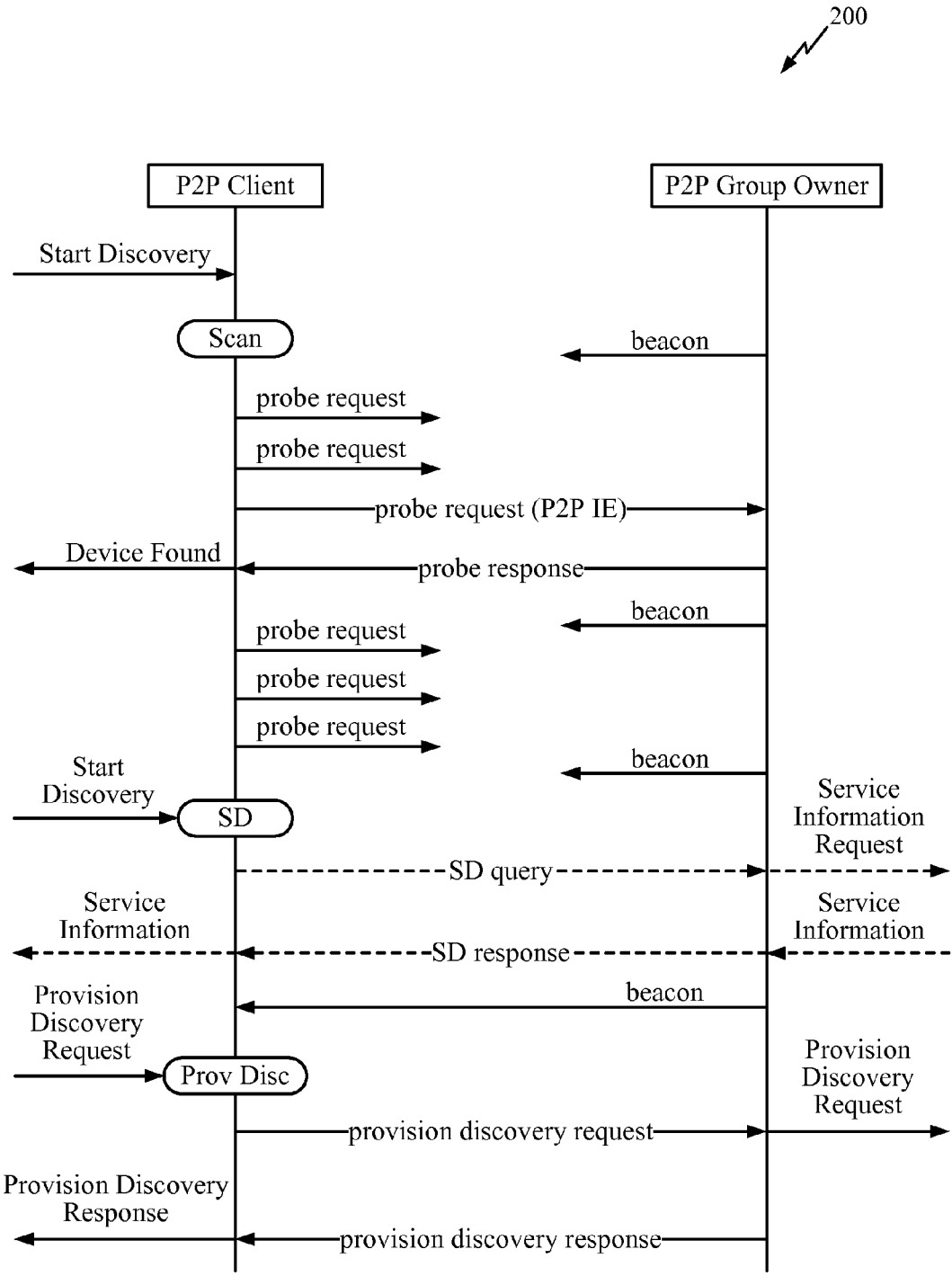
FIGS. 2 and 3 illustrate an exemplary frame exchange to establish a P2P connection between a P2P client and a P2P group owner, according to one exemplary embodiment.

For example, according to one exemplary embodiment, FIG. 2 illustrates an exemplary frame exchange 200 to establish a P2P connection between a P2P client and a P2P group owner. To simplify the description provided herein, the exemplary frame exchange 200 shown in FIG. 2 relates to a scenario in which the P2P client attempts to discover and associate with an operational P2P group that has already been formed. However, it will be apparent that the description provided herein may similarly apply to scenarios in which the P2P group has not yet been formed, in which case the frame exchange 200 to establish the P2P connection would include additional frame exchanges that relate to forming a new P2P group among two devices that desire to communicate peer-to-peer and a resource negotiation to establish which of the two devices will be the P2P group owner that creates and manages the connection (e.g., based on factors that include but are not limited to power management, number of connections supported, and services offered, as described in commonly owned U.S. patent application Ser. No. 13/103,733, entitled "RESOURCE COORDINATION FOR PEER-TO-PEER GROUPS THROUGH DISTRIBUTED NEGOTIATION," filed May 9, 2011, the contents of which are hereby incorporated by reference in their entirety).

In one embodiment, to establish the P2P connection between the P2P client and the P2P group owner associated with the operational P2P group, the frame exchange 200 shown in FIG. 2 may initially include the P2P client starting a peer discovery process that involves scanning a wireless network to detect the presence of neighboring P2P group owners, including the P2P group owner shown in FIG. 2. In general, the peer discovery process may be accomplished using a scan having substantially similar characteristics traditionally used to discover an infrastructure access point (AP). For example, in one embodiment, the P2P client may transmit probe request packets (e.g., proximity detection signals) to indicate the presence of the P2P client on the wireless network and execute one or more listeners to detect beacons and probe response packets that the P2P group owner transmits over the wireless network in response to the probe request packets. Furthermore, in one embodiment, the P2P group owner may transmit the beacons over the wireless network to advertise the presence of the operational P2P group and the P2P group owner and execute one or more listeners to detect the probe request packets transmitted by the P2P client. As such, in response to detecting a particular probe request packet transmitted from the P2P client via the one or more listeners, the P2P group owner may obtain one or more Information Elements (IEs) that the P2P client included in the probe requests and transmit a probe response packet that includes one or more IEs associated with the P2P group owner to the P2P client, wherein the P2P client may similarly detect the probe response packet via the one or more listeners.

Accordingly, in one embodiment, the P2P group owner and the P2P client may use the IEs obtained from the probe request packet and the probe response packet, respectively, to populate a list that identifies devices found during the peer discovery process. Furthermore, the P2P group owner may use Wi-Fi Simple Configuration (WSC), Wi-Fi Protected Setup (WPS), or other suitable technologies to obtain credentials and authenticate the scanning P2P client based on the IEs obtained from the probe request packet. In one embodiment, the following tables respectively show an exemplary format for the IEs included in the probe request and probe response packets, an exemplary format for one or more P2P attributes that appear in the IEs included in the probe request and probe response packets, and definitions for identifiers associated with the one or more P2P attributes that appear in the IEs included in the probe request and probe response packets:

TABLE 1

P2P Information Element Format

| Field | Size (octets) | Value (hexadecimal) | Description |
|---|---|---|---|
| Element ID | 1 | 0xDD | IEEE 802.11 vendor specific usage. |
| Length | 1 | variable | Length of the following fields in the Information Element (IE) in octets. The Length field is a variable and set to 4 plus the total length of P2P attributes. |
| OUI | 3 | 50 6F 9A | WFA specific Organizationally Unique Identifier. |
| OUI Type | 1 | 0x09 (to be assigned) | Identifying the type or version of P2P IE. Setting to 0x09 indicates WFA P2P v1.0. |
| P2P Attributes | variable | — | One or more P2P attributes that appear in the P2P IE and are formatted as defined in Table 2. |

TABLE 2

General P2P Attribute Format

| Field | Size (octets) | Value (hexadecimal) | Description |
|---|---|---|---|
| Attribute ID | 1 | variable | Identifies the type of P2P attribute. The specific value is defined in Table 3. |
| Length | 2 | variable | Length of the following fields in the attribute. |
| Attributes Body Field | variable | — | Attribute-specific information fields. |

TABLE 3

P2P Attribute ID Definitions

| Attribute ID | Description |
|---|---|
| 0 | Status |
| 1 | Minor Reason Code |
| 2 | P2P Capability |
| 3 | P2P Device ID |
| 4 | Group Owner Intent |
| 5 | Configuration Timeout |
| 6 | Listen Channel |
| 7 | P2P Group BSSID |
| 8 | Extended Listen Timing |
| 9 | Intended P2P Interface Address |
| 10 | P2P Manageability |

TABLE 3-continued

P2P Attribute ID Definitions

| Attribute ID | Description |
|---|---|
| 11 | Channel List |
| 12 | Notice of Absence |
| 13 | P2P Device Information |
| 14 | P2P Group Information |
| 15 | P2P Group ID |
| 16 | P2P Interface |
| 17 | Operating Channel |
| 18 | Invitation Flags |
| 19-220 | Reserved |
| 221 | Vendor Specific Attribute |

According to one embodiment, in response to suitably completing the peer discovery process and detecting the P2P group owner, the P2P client may initiate an optional service discovery process to determine information about one or more services provided by the P2P group owner prior to attempting to associate with the P2P group owner and before having an IP address to connect with the operational P2P group. For example, in one embodiment, the operational P2P group may generally provide an IP network between the P2P group owner and any other associated devices, with the P2P group owner essentially providing the connection to other participants in the P2P group in lieu of the AP used in traditional Wi-Fi connections. As such, in one embodiment, the service discovery process shown in FIG. 2 may allow the P2P client to send a service discovery query to the P2P group owner found in the peer discovery process to request information about the services provided by the P2P group owner. The P2P group owner may then return the requested service information to the P2P client within a service discovery response packet. Furthermore, because the operational P2P group may provide an IP network between the P2P group owner and the associated devices, the service discovery query and the service discovery response packets may be implemented using any suitable service discovery method that can be employed on a wireless LAN, including Bonjour and UPnP, among others. Alternatively (or additionally), the P2P group owner can transmit one or more beacons that advertise services supported or otherwise available on the operational P2P group prior to a connection setup and thereby automatically notify the P2P client about the supported or available services. As such, the service discovery process may improve user experiences because the P2P client can know whether desired services (e.g., printing) will be available on the operational P2P group prior to associating with the P2P group owner and obtaining an IP address to connect with the P2P group owner.

According to one embodiment, in response to the P2P client desiring to associate with the P2P group owner or otherwise join the operational P2P group, the P2P client may then perform a provision discovery process to obtain information that may be used to subsequently associate with the P2P group owner and thereby join the operational P2P group. For example, in one embodiment, the P2P client may transmit a provision discovery request packet to the P2P group owner, wherein the provision discovery request packet may include one or more parameters that relate to a P2P capability associated with the P2P client (e.g., whether the P2P client has enabled service discovery and/or discoverability, supports concurrent connections to multiple P2P groups and/or traditional wireless LANs, etc.), P2P device information (e.g., the MAC address, primary device type, and device name of the P2P client), and WSC configuration methods that are supported and/or enabled on the P2P client. As such, the P2P group owner may use the various parameters provided in the provision discovery request to provision the P2P client and subsequently manage the P2P client once the operational P2P group has been joined. Furthermore, in response to receiving the provision discovery request from the P2P client, the P2P group owner may transmit a provision discovery response packet to the P2P client, wherein the provision discovery response packet may include generally similar information to the provision discovery request packet to provide the P2P client with information to subsequently associate with the P2P group owner (e.g., P2P capabilities that the P2P group owner has enabled or supports, the MAC address of the P2P group owner, WSC configuration methods and related data that the P2P client should use to associate with the P2P group owner, etc.).

Figure 3:
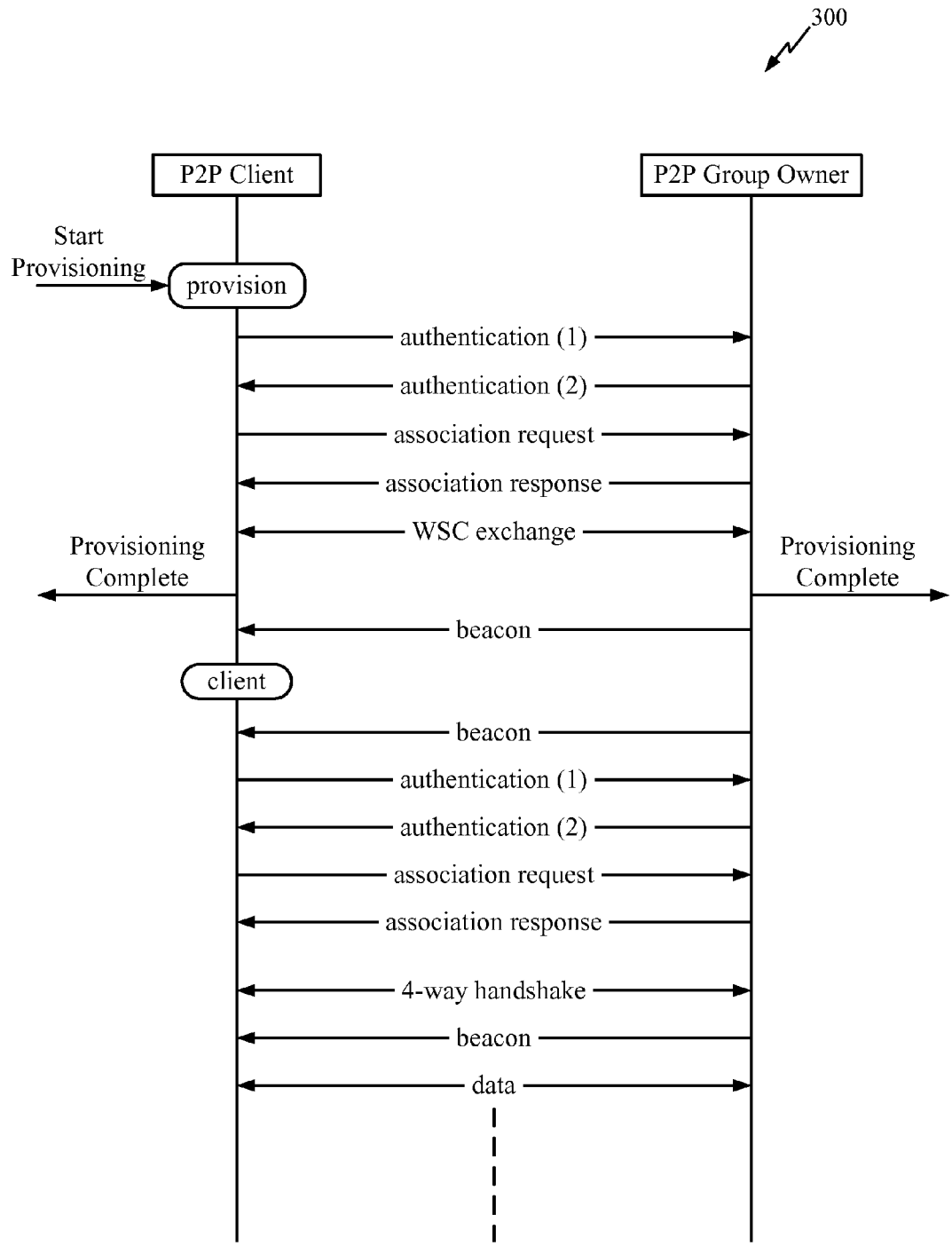

According to one exemplary embodiment, FIG. 3 shows another exemplary frame exchange 300, which continues the frame exchange 200 shown in FIG. 2 to establish the P2P connection between the P2P client and the P2P group owner. More particularly, in response to suitably completing the peer discovery process and the provision discovery process (and/or the optional service discovery process), the P2P client may then start a provisioning process to associate with the P2P group owner and thereby join the operational P2P group. For example, in one embodiment, the previous provision discovery process would have included an invitation exchange in the illustrated scenario where the P2P client is attempting to join the existing operational P2P group, or alternatively a group owner negotiation in a scenario where the P2P client and the P2P group owner formed a new P2P group. In either case the P2P client may have received information indicating a channel on which the P2P group owner is operating the P2P group, which the P2P client would have received in the invitation exchange (in the illustrated scenario) or the group owner negotiation (in the latter scenario). As such, the P2P client may begin operating on the group owner operating channel to start the provisioning process, wherein the P2P client and the P2P group owner may then exchange respective authentication packets to establish and exchange appropriate security information (e.g., tokens, credentials, or other suitable information that the P2P client and the P2P group owner may use to validate one another).

In response to the P2P client and the P2P group owner mutually authenticating one another via the respective authentication packets, the P2P client may then transmit an association request to the P2P group owner. For example, in one embodiment, the P2P client may transmit the association request packet to the MAC address of the P2P group owner and the P2P group owner may then transmit an association response packet to the P2P client to indicate that the association operation successfully completed. In general, the authentication and association packets may be exchanged and processed using any suitable technique traditionally used to connect a client device with an infrastructure AP, including those set forth in IEEE 802.11, IEEE 802.1x, or other suitable standards. In one embodiment, the P2P client and the P2P group owner may then exchange suitable WSC information to manage subsequent communication on the operational P2P group, wherein the exchanged WSC information may include cryptographic keys, authentication and cipher algorithms, or other suitable information in accordance with the WSC configuration methods exchanged during the provision discovery process, at which time the provisioning process associating the P2P client with the P2P group owner may be complete. Furthermore, in one implementation, the P2P group owner may continue to periodically transmit beacon frames to the P2P client to announce the presence of the operational P2P group and provide information about the communication network. For example, the beacon frames may include a header that contains source and destination MAC addresses (i.e., the MAC address of the P2P group owner and the P2P client, respectively) in addition to a timestamp that the P2P client may use to synchronize with the P2P group owner, a beacon interval indicating an amount of time between beacon transmissions, capabilities supported or enabled on the P2P group owner and the operational P2P group, polling details, encryption data, and/or other management information associated with the operational P2P group.

In one embodiment, to communicate data with the operational P2P group subsequent to completing the provisioning process, the P2P client and the P2P group owner may perform another mutual authentication and association process having substantially similar characteristics to that described above during the provisioning process in addition to a four-way handshake to provide an additional level of security to the association between the P2P client and the P2P group owner (e.g., via authenticating the P2P group owner to the P2P client and deriving one or more keys that will be used to encrypt data communicated via the P2P connection being established). For example, in one embodiment, the prior WSC exchange may have included the P2P group owner providing a shared secret Pairwise Master Key (PMK) that will be persistent during the entire connection, and the four-way handshake may use the PMK to generate a Pairwise Transient Key (PTK) that comprises a cryptographic hash function based on the PMK with a nonce value that the P2P group owner sends to the P2P client in a first transmission, a nonce value generated at the P2P client, the MAC address of the P2P group owner, and the MAC address of the P2P client. The four-way handshake then includes the P2P client sending its nonce value to the P2P group owner together with a message authentication code in a second transmission, the P2P group owner sending a Group Temporal Key (GTK) used to decrypt multicast and broadcast traffic, a sequence number that will be used in a next multicast or broadcast frame, and another message authentication code to the P2P client in a third transmission, and the P2P client sending a confirmation or acknowledgement to the P2P group owner in a fourth transmission.

Figure 4:
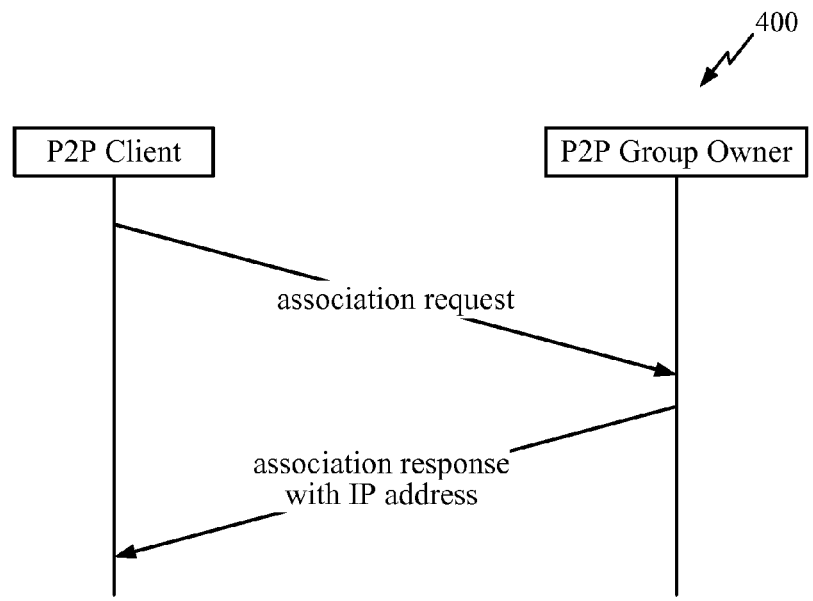
FIGS. 4 and 5 illustrate exemplary methods to assign an IP address to a P2P client in one or more frames communicated from a P2P group owner to the P2P client during a connection establishment phase, according to one exemplary embodiment.
Figure 5:
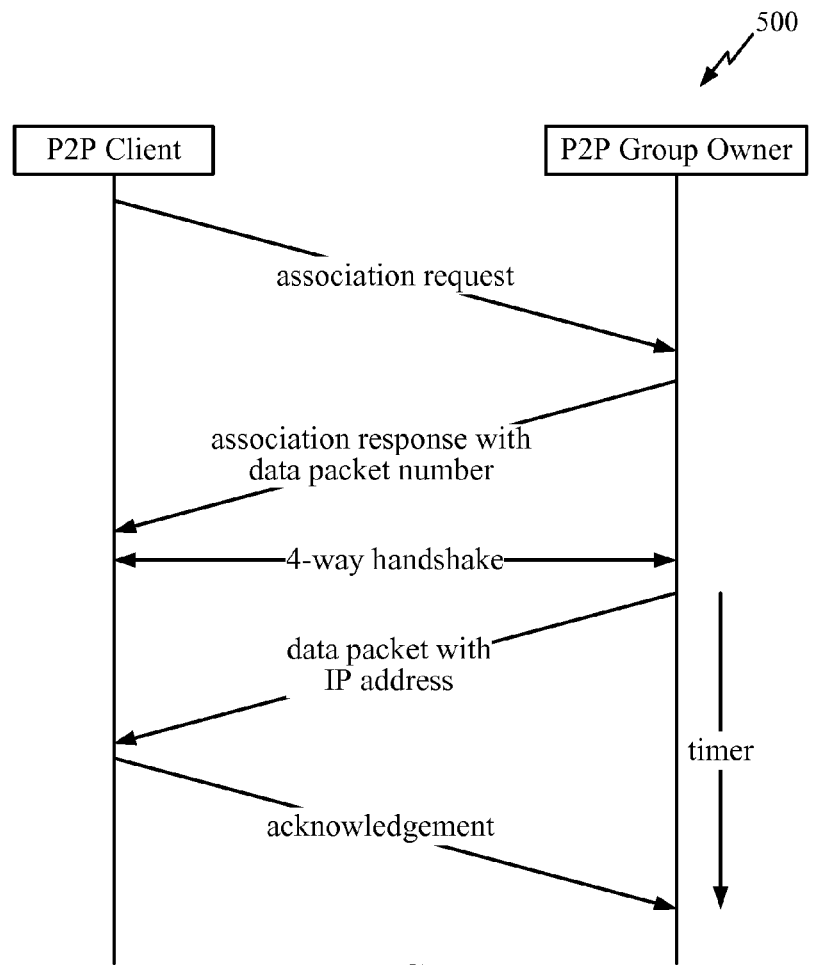

At this point, conventional approaches would have the P2P group owner invoke an external DHCP server or an internal DHCP server (e.g., run with ICS) to assign an IP address to the P2P client and thereby enable the P2P client to communicate data over an IP layer via the connection established with the P2P group owner. In contrast, FIGS. 4 and 5 illustrate exemplary methods 400 and 500 according to one or more exemplary embodiments in which the IP address may be assigned to the P2P client in one or more P2P frames that the P2P group owner communicates to the P2P client during the connection establishment phase. Accordingly, the methods 400 and 500 shown in FIGS. 4 and 5 and described herein may provide an embedded thin DHCP mechanism that may eliminate or substantially reduce the need to have the external or internal DHCP server assign the IP address to the P2P client. For example, whereas conventional approaches employ a heavyweight DHCP server to assign the IP address and require a four-way handshake to be completed prior to the DHCP server issuing the IP address, the embedded thin DHCP mechanism described herein may assign the P2P client an IP address that has four octets, which may be encoded in the three parts.

As noted above, P2P networks generally include a small number of devices, all of which fall under the same subnet, whereby the first part may hardcode the first two octets in the IP address (e.g., 192.168.xxx.xxx). The second part may include the P2P client deriving the third octet in the IP address, which specifies the subnet, from the MAC (or physical) address of the P2P group owner. As such, the P2P client may automatically determine the first three octets in the IP address because the first two octets are hardcoded (and therefore predetermined) and because the P2P client knows the MAC address of the P2P group owner from the IEs contained in one or more of the frames that the P2P group owner communicated to the P2P client during the peer discovery, provision discovery, and/or provisioning processes (e.g., one or more of the beacons, the probe response, the provision discovery response, etc.). Furthermore, in one embodiment, the P2P client may employ a simple algorithm to derive the third octet from the MAC address of the P2P group owner to reduce the possibility that the subnet address encoded therein will be duplicated on nearby P2P networks. In one embodiment, to complete the IP assignment process, the P2P group owner may serve as the central authority to maintain a list of IP addresses within the P2P group managed thereby and use two different techniques to pass the fourth octet that specifies the IP number to the P2P client during the connection establishment phase.

For example, according to one exemplary embodiment, the method 400 shown in FIG. 4 provides the first technique that the P2P group may use to pass the fourth octet to the P2P client. More particularly, as shown in FIG. 4, the first technique may comprise the P2P group owner selecting any suitable mandatory frame that will be communicated to the P2P client in the connection establishment phase and may preferably select the last frame that will be exchanged prior to the four-way handshake (e.g., the association response frame), wherein the P2P group owner may add the fourth octet in the P2P Information Element (IE) part of the selected mandatory frame. In one embodiment, the P2P group owner may embed the IP number within the P2P Attributes body of the P2P IE part of the selected mandatory frame with Attribute ID 221 ("Vendor Specific Attribute"), as shown in Tables 1-3 above. Furthermore, in one embodiment, the P2P group owner may split the IP address used in the fourth octet into multiple parts that will be passed in multiple frames (e.g., passing a first part of the IP number in the association response frame and a second part of the IP number in one of the handshakes in the four-way handshake). In this manner, an additional level of security may be provided against malicious users who may know the selected mandatory frame that will contain the IP number and can therefore obtain the IP address by sniffing that frame. In either case, embedding the IP number in the selected mandatory frame may guarantee that the P2P client has all the information needed to construct the IP address assigned thereto at the time that the connection with the P2P group owner is established, especially when the selected mandatory frame corresponds to the association response frame, which is typically the final frame required to establish the connection between the P2P client and the P2P group owner. Moreover, the technique to embed the IP number in the IE part of the mandatory frame (or any other frame that may be selected) can be simply and easily implemented. However, because placing the IP number in the association response frame technically embeds layer three data in a layer two frame, this technique may be better suited for use in applications that emphasize functionality or form or aesthetics (e.g., an amateur game console for a set of Wi-Fi capable devices versus a commercial software release).

According to one exemplary embodiment, the method 500 shown in FIG. 5 provides the second technique that the P2P group may use to pass the fourth octet to the P2P client, wherein the second technique may comprise the P2P group owner using separate data frames to pass the IP number to the P2P client, which may better adhere to standard programming practices and guarantee better security for the data containing the IP number. More particularly, in the second technique, the P2P group owner may similarly select a mandatory frame that will be communicated to the P2P client in the connection establishment phase, which may preferably be the last frame exchanged during connection establishment (e.g., the association response frame). However, the second technique may differ from the first technique in that the P2P group owner may add information to the selected frame that identifies a subsequent data packet that will contain the IP number within the Vendor Specific Attribute IE in the selected frame (i.e., P2P Attribute ID 221). For example, in one embodiment, the information contained within the Vendor Specific Attribute IE may indicate that the first data packet sent to the P2P client following the association between the P2P client and the P2P group owner will have the IP number (e.g., the first data packet subsequent to the four-way handshake). Alternatively, in one embodiment, the P2P group owner may randomize the data packet subsequent to the four-way handshake that will have the IP number embedded therein to provide additional security measures because fixing the particular data packet in which the IP number is passed may raise security issues in the sense that malicious users who know which data packet will have the IP number may simply sniff that packet to obtain the IP address assigned to the P2P client (although using the first data packet may be the simplest to implement and guarantee that the connection will be established as soon as possible following the four-way handshake).

Furthermore, in one embodiment, the P2P group owner may employ a timer to handle situations in which the P2P data packet having the IP number embedded therein may be missed by the P2P client or otherwise lost during transmission to the P2P client in the same or a substantially similar manner to Transmission Control Protocol (TCP). For example, in one embodiment, the P2P group owner may start the timer when the P2P group owner transmits the data packet with the IP number to the P2P client and buffer the frame that contains the data packet with the IP number. In response to receiving an acknowledgement packet indicating that the P2P client successfully received the data packet with the IP number, the P2P group owner may then stop the timer and release the buffered frame. Alternatively, if the P2P group owner does not receive an acknowledgement packet from the P2P client before the timer expires, the P2P group owner may retransmit the buffered frame to the P2P client and restart the timer, wherein this process may be repeated until the P2P client acknowledges that the data packet with the IP number was received. Furthermore, in one embodiment, the number of times to repeat the process to retransmit the buffered frame if the P2P group owner does not receive the acknowledgement from the P2P client may be limited to handle scenarios where the P2P client may be out-of-range, powered down, or otherwise unreachable (e.g., if the P2P group owner does not receive the acknowledgement message after the retransmission has been attempted five times or another suitable number of times, the P2P group owner may discontinue any further retransmissions and assume that the P2P client has become unreachable).

According to one embodiment, in response to the P2P client receiving the IP number that the P2P group owner assigned thereto, whether via the first or second technique, the P2P client may then have the fourth octet and generate the complete IP address as 192.168.<subnet from P2P group owner MAC address>.<IP number>. In one embodiment, the generated IP address may then be statically set on the P2P client programmatically using an operating system Application Program Interface (API) or other suitable utilities (e.g., Netsh in Windows). Alternatively, in one embodiment, the P2P group owner may dynamically assign the IP address to the P2P client each time that the P2P client establishes a new connection therewith. Further, in one embodiment, the P2P group owner may maintain a list of the IP addresses that has been assigned to the P2P clients in the P2P group, mark the IP address assigned to a particular P2P client 'inactive' in response to the particular P2P client disconnecting from the P2P group or otherwise losing connectivity with the P2P group owner, and store a time stamp to indicate when the P2P client disconnected or otherwise lost connectivity. As such, if the same device subsequently attempts to rejoin the P2P group within a short time period, the P2P group owner may mark the IP address 'active' and reissue the same IP address to the P2P client. For example, in one embodiment, the P2P group owner may employ an 'age out' period to maintain the list of the IP addresses that have been assigned to the P2P clients, wherein the 'age out' period may define an amount of time after which any IP addresses marked 'inactive' can be permanently removed from the list (e.g., fifteen minutes or another suitable time period). Moreover, in one embodiment, the embedded thin DHCP mechanism described above may eliminate or substantially reduce the need to have a finite lease period for the IP addresses that have been assigned to the P2P clients and not been marked 'inactive' because the P2P group (or network) may have a small number of devices and a short lifecycle compared to larger networks.

In one embodiment, the embedded thin DHCP mechanism described above may also be used to manage external connectivity to the Internet, provided that the subnet value used in the third octet should comply with Internet Connection Sharing (ICS) requirements. For example, Windows ICS mandates that the IP address assigned to clients must be encoded as 192.168.137.x. As such, to use the embedded thin DHCP mechanism in an ICS implementation, the third octet in the IP address should be established in accordance with the particular specifications of the ICS implementation, and the same is true if the embedded thin DHCP mechanism is employed on a conventional DHCP server or a DHCP server run on a P2P group owner by ICS. Furthermore, in one embodiment, the embedded thin DHCP mechanism may have applications to IPv6 architectures, which generally uses 128-bit addresses that contain eight groups of four hexadecimal digits separated by colons (e.g., 2001:0 db8:85a3:0042:0000:8a2e:0370: 7334), whereas IPv4 architectures use 32-bit addresses that contain four octets separated by dots (e.g., 192.168.0.1). As such, to apply the embedded thin DHCP mechanism to IPv6 architectures, either the full IP address may be embedded in a single data frame or passed to clients in multiple data frames in accordance with values designated or otherwise embedded in a frame mandatory to connection establishment, which may preferably be the final frame in the connection establishment phase.

Those skilled in the pertinent art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields, particles, or any combination thereof. Further, many embodiments may be described in terms of sequences of actions to be performed by, for example, elements of a computing device. It will be recognized that various actions described herein can be performed by specific circuits (e.g., an application specific integrated circuit), program instructions executed by one or more processors, or any combination thereof. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action, Further, those skilled in the pertinent art will appreciate that the various illustrative logical blocks, modules, circuits, algorithms, and steps described in connection with the embodiments disclosed herein may be implemented as electronic hardware, computer software, or any suitable combinations thereof. To clearly illustrate this interchangeability of hardware and software, various illustrative components, blocks, modules, circuits, algorithms, and steps have been described above in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present invention.

For example, the various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, etc.).

Furthermore, the steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative embodiments of the invention, those skilled in the pertinent art will appreciate that various changes and modifications could be made herein without departing from the scope or spirit of the invention, as defined by the appended claims. The functions, steps, operations, and/or actions of the method claims in accordance with the embodiments of the invention described herein need not be performed in any particular order. Furthermore, although elements of the invention may be described or claimed in the singular, the plural is contemplated unless limitation to the singular is explicitly stated. Thus, the disclosure is not intended to be limited to the examples and embodiments described herein, but is to be accorded the widest scope consistent with the principles and novel features disclosed herein.

What is claimed is:

1. A method for providing an embedded thin Dynamic Host Configuration Protocol (DHCP) mechanism, comprising:
   receiving, at a first device, one or more first data frames from a second device that manages a peer-to-peer network, wherein the one or more first data frames specify a physical address associated with the second device that manages the peer-to-peer network;
   receiving, at the first device, one or more second data frames from the second device during a phase to establish a connection with the peer-to-peer network, wherein the one or more second data frames specify an IP number assigned to the first device; and
   generating, at the first device, an IP address to communicate on the peer-to-peer network via the established connection, wherein the IP address comprises a first hardcoded octet, a second hardcoded octet, a third octet derived from the physical address associated with the second device that manages the peer-to-peer network, and a fourth octet comprising the IP number assigned to the second device as specified in the one or more second data frames.

2. The method of claim 1, wherein the one or more second data frames comprise an association response frame having the IP number embedded in an Information Element.

3. The method of claim 1, wherein the one or more second data frames comprise an association response frame and at least one subsequent frame.

4. The method of claim 3, wherein the association response frame has a first part of the IP number embedded in a first Information Element and the at least one subsequent frame has a second part of the IP number embedded in a second Information Element.

5. The method of claim 3, wherein the association response frame includes an Information Element specifying the at least one subsequent frame and the at least one subsequent frame has the IP number embedded therein.

6. The method of claim 5, further comprising transmitting, by the first device, an acknowledgement message to the second device that manages the peer-to-peer network in response to successfully receiving the at least one subsequent frame that has the IP number embedded therein.

7. The method of claim 1, further comprising deriving, at the first device, the third octet from the physical address associated with the second device that manages the peer-to-peer network according to a predetermined algorithm.

8. The method of claim 1, further comprising negotiating resources to assign a group owner role to the second device that manages the peer-to-peer network and a client role to the first device to newly establish the peer-to-peer network.

9. The method of claim 1, further comprising statically setting the IP address to communicate on the peer-to-peer network on the first device.

10. An apparatus for providing an embedded thin Dynamic Host Configuration Protocol (DHCP) mechanism, comprising:
    means for receiving, from a device configured to manage a peer-to-peer network, one or more first data frames that specify a physical address associated with the device configured to manage the peer-to-peer network;
    means for receiving one or more second data frames that specify an IP number assigned to the apparatus during a phase to establish a connection with the peer-to-peer network; and
    means for generating an IP address to communicate on the peer-to-peer network via the established connection, wherein the IP address comprises a first hardcoded octet, a second hardcoded octet, a third octet derived from the physical address associated with the device configured to manage the peer-to-peer network, and a fourth octet comprising the IP number assigned to the apparatus as specified in the one or more second data frames.

11. The apparatus of claim 10, wherein the one or more second data frames comprise an association response frame having the IP number embedded in an Information Element.

12. The apparatus of claim 10, wherein the one or more second data frames comprise an association response frame and at least one subsequent frame.

13. The apparatus of claim 12, wherein the association response frame has a first part of the IP number embedded in a first Information Element and the at least one subsequent frame has a second part of the IP number embedded in a second Information Element.

14. The apparatus of claim 12, wherein the association response frame includes an Information Element specifying the at least one subsequent frame and the at least one subsequent frame has the IP number embedded therein.

15. The apparatus of claim 14, further comprising means for transmitting an acknowledgement message to the device configured to manage the peer-to-peer network, wherein the acknowledgement message indicates that the at least one subsequent frame that has the IP number embedded therein was successfully received at the first apparatus.

16. The apparatus of claim 10, further comprising means for deriving the third octet from the physical address associated with the device configured to manage the peer-to-peer network according to a predetermined algorithm.

17. The apparatus of claim 10, further comprising means for negotiating resources to assign a group owner role to the device configured to manage the peer-to-peer network and a client role to the apparatus to newly establish the peer-to-peer network.

18. The apparatus of claim 10, further comprising means for statically setting the IP address to communicate on the peer-to-peer network on the apparatus.

19. An apparatus for providing an embedded thin Dynamic Host Configuration Protocol (DHCP) mechanism, comprising:
a processor configured to receive, from a device configured to manage a peer-to-peer network, one or more first data frames that specify a physical address associated with the device configured to manage the peer-to-peer network, receive one or more second data frames that specify an IP number assigned to the apparatus during a phase to establish a connection with the peer-to-peer network, and generate an IP address to communicate on the peer-to-peer network via the established connection, wherein the IP address comprises a first hardcoded octet, a second hardcoded octet, a third octet derived from the physical address associated with the device configured to manage the peer-to-peer network, and a fourth octet comprising the IP number assigned to the apparatus as specified in the one or more second data frames; and
a memory coupled to the processor.

20. A computer-readable storage medium storing computer-executable instructions for providing an embedded thin Dynamic Host Configuration Protocol (DHCP) mechanism, wherein executing the computer-executable instructions on a processor associated with a first device causes the processor to:

receive, at the first device, one or more first data frames from a second device configured to manage a peer-to-peer network, wherein the one or more first data frames specify a physical address associated with the second device configured to manage the peer-to-peer network;
receive, at the first device, one or more second data frames from the second device during a phase to establish a connection with the peer-to-peer network, wherein the one or more second data frames specify an IP number assigned to the first device; and
generate, at the first device, an IP address to communicate on the peer-to-peer network via the established connection, wherein the IP address comprises a first hardcoded octet, a second hardcoded octet, a third octet derived from the physical address associated with the second device that manages the peer-to-peer network, and a fourth octet comprising the IP number assigned to the second device as specified in the one or more second data frames.

21. The method of claim 4, wherein the at least one subsequent frame that has the second part of the IP number embedded therein is received during a four-way handshake to exchange security information with the second device that manages the peer-to-peer network.

22. The method of claim 5, wherein the second device that manages the peer-to-peer network randomizes the at least one subsequent frame that has the IP number embedded therein.

23. The method of claim 5, wherein the at least one subsequent frame that has the IP number embedded therein comprises a first data packet subsequent to a four-way handshake in which security information is exchanged with the second device that manages the peer-to-peer network.

24. The method of claim 1, further comprising:
losing connectivity with the peer-to-peer network; and
attempting to rejoin the peer-to-peer network using the generated IP address.

* * * * *